Nov. 14, 1950 J. H. Q. BURKE 2,529,998
BRUSH SPREADING ATTACHMENT FOR TRACTORS
Filed July 17, 1950 3 Sheets-Sheet 1
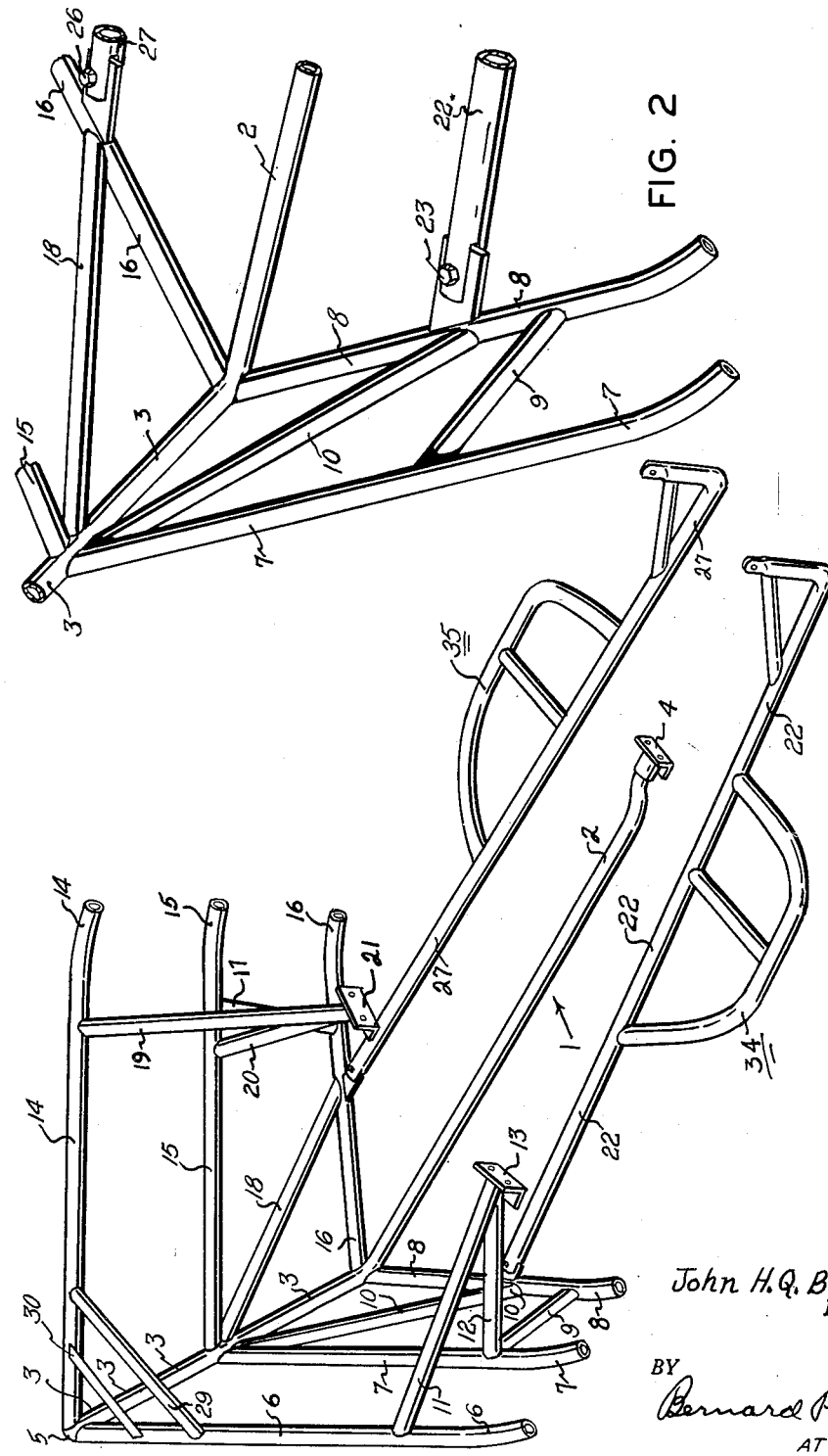
John H. Q. Burke
INVENTOR,
BY Bernard P. Miller
ATTORNEY Nov. 14, 1950     J. H. Q. BURKE     2,529,998
BRUSH SPREADING ATTACHMENT FOR TRACTORS
Filed July 17, 1950     3 Sheets-Sheet 2
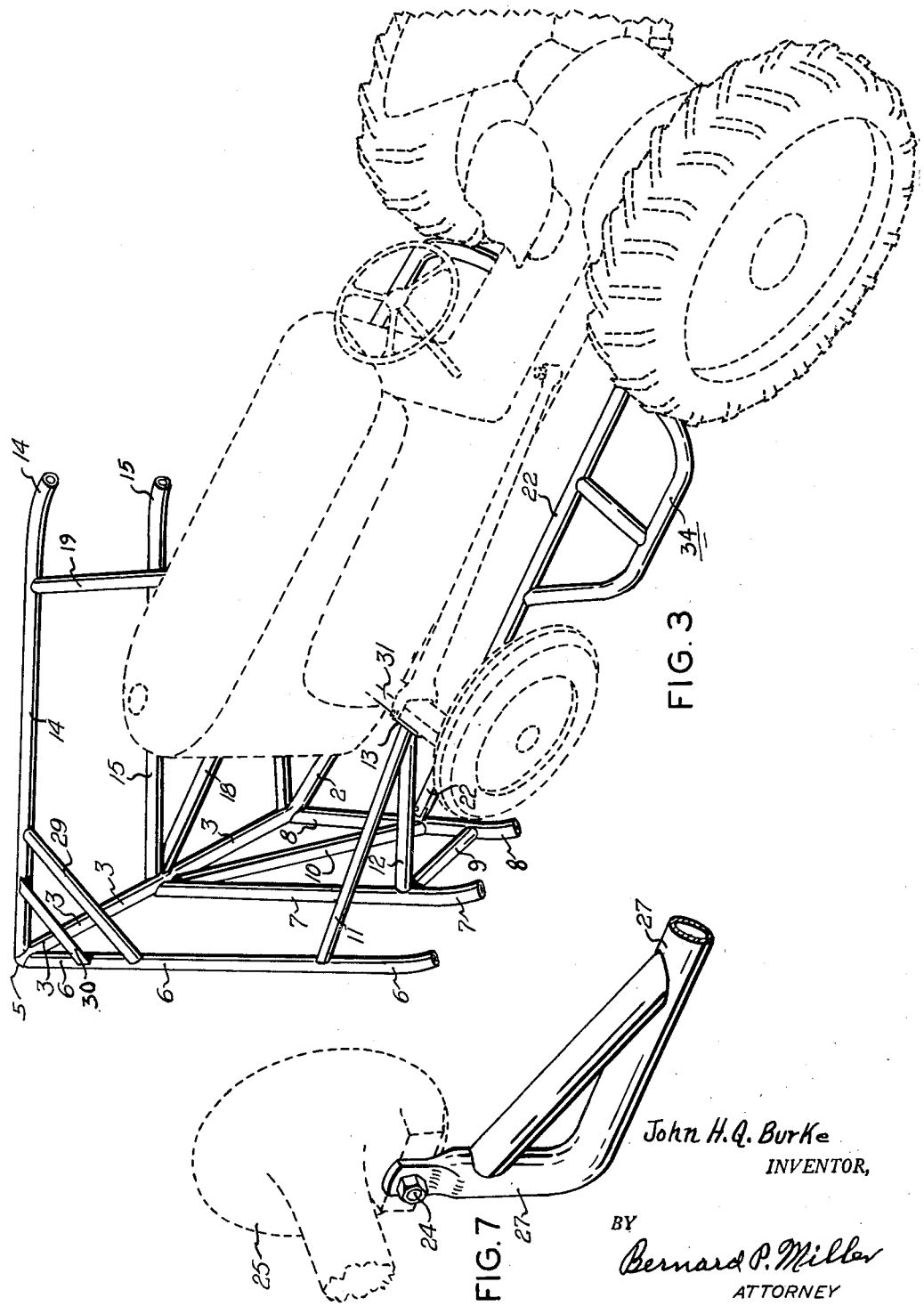
John H.Q. Burke
INVENTOR,
BY
Bernard P. Miller
ATTORNEY Nov. 14, 1950  J. H. Q. BURKE  2,529,998
BRUSH SPREADING ATTACHMENT FOR TRACTORS
Filed July 17, 1950  3 Sheets-Sheet 3
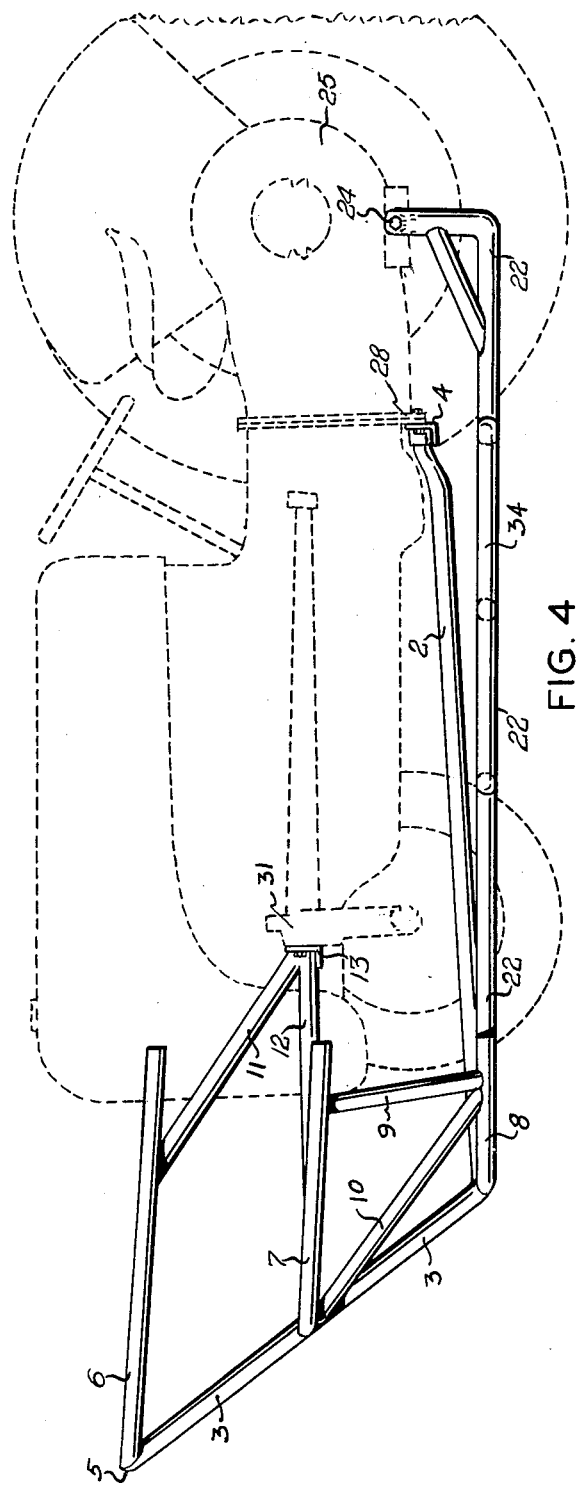
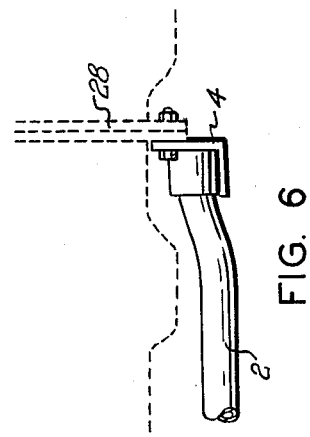
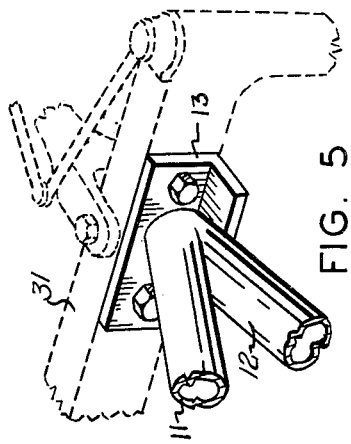
John H. Q. Burke
INVENTOR,
BY
Bernard P. Miller
ATTORNEY Patented Nov. 14, 1950

2,529,998

UNITED STATES PATENT OFFICE 2,529,998

BRUSH SPREADING ATTACHMENT FOR TRACTORS

John H. Q. Burke, Oklahoma City, Okla.

Application July 17, 1950, Serial No. 174,327

7 Claims. (Cl. 97—192)

1

The present invention pertains to the general art of underbrush destruction, and more particularly to the agricultural spraying of chemicals for underbrush elimination.

In chemical spraying for the destruction of underbrush, best results are obtained if the chemical can be laid adjacent the earth's surface. Such spraying cannot be accomplished in thick underbrush by a person on foot, because it is necessary to transport a tank of the chemical, and also some suitable mechanism for power jetting or spraying the same adjacent the earth's surface.

Attempts have heretofore been made to mount the chemical tank and spraying equipment on conventional tractors, but some underbrush is too thick to be negotiated by conventional light weight farm tractors. When such tractors are successful in traveling through the underbrush, they merely bend the brush over without spreading it, with the result that the chemical is not properly applied adjacent the roots of the underbrush.

The principal object of the present invention is to provide a brush spreading attachment for the front end of conventional tractors.

Another object is to provide an attachment which will spread the underbrush laterally in front of the front tractor wheels, so that the wheels passing thereover will maintain it in its laterally bent position, thus affording plenty of time for the spraying operation to be accomplished without stopping the forward progress of the tractor.

A further object is to provide an attachment of this class which is comparably easy and simple to install and remove.

An additional object is to provide an underbrush spreading tractor attachment which is strong, durable, and positive in action.

Other objects will be apparent from the following description when taken in conjunction with the accompanying three sheets of drawings, wherein:

Figure 1 is a perspective view of the attachment;

Figure 2 is an enlarged fragmentary perspective view of the same;

Figure 3 is a dotted line perspective view of a conventional tractor, upon which the device of the invention is shown installed, the device being shown in solid lines;

Figure 4 is a side elevational view of the equipment shown in Fig. 3;

Figure 5 is an enlarged perspective view detailing one manner in which the attachment is connected to the front end of the tractor;

Figure 6 is an enlarged fragmentary side elevational view showing another connection to the tractor; and, Figure 7 is an enlarged fragmentary perspective view showing still another tractor connection.

Like characters of reference designate like parts in those figures of the drawings in which they occur.

In the drawings:

The reference numeral 1 indicates an elongated central frame member or beam having a substantially horizontal rear portion 2 and an upwardly and forwardly tilted front portion 3. The beam 1 is made of steel, and may be made of angle iron, solid rod, or of tube stock as preferred, with its rear end being welded or otherwise rigidly connected to a mounting bracket 4. The upper front end of the beam 1 is indicated by the reference numeral 5.

The device further includes two wing portions which are rigidly connected to the beam portion 3 at their front ends, and which extend outwardly and rearwardly therefrom.

The left hand wing portion is preferably composed of three vertically spaced substantially parallel spreader elements or arms 6, 7 and 8 which have their front ends weld-integrated with the beam portion 3. The two lower arms 7 and 8 are connected by braces 9 and 10 which are welded to the arms. The upper end of the brace 10 is also welded to the beam portion 3. The two upper arms 6 and 7 are provided with rigidly connected thrust members 11 and 12 which extend rearwardly therefrom, and which converge vertically to meet at a transverse mounting bracket 13 of angle iron. The elements 6, 7, 8, 9 and 10 combine to form the left hand wing portion, with the slanting beam portion 3 acting as the leading edge thereof.

The right hand wing portion is preferably formed in a similar manner, having outwardly and rearwardly extending spreader arms 14, 15 and 16 which have their front ends welded to the beam portion 3. The two lower arms 15 and 16 are connected by brace members 17 and 18 which are comparable to the braces 9 and 10 of the left hand wing. The elements 14, 15, 16, 17 and 18 combine to form the right hand wing portion of the device.

The upper arms 14 and 15 are provided with rearwardly extending thrust members 19 and 20 which converge vertically to meet at a transverse mounting plate or bracket 21.

A substantially horizontal thrust member 22 has its front end pivotally connected to the lower left hand spreader arm 8 by a pivot pin 23, and its rear end portion is upturned and transversely perforated to receive a bolt 24 for connecting the arm to the rear axle gear housing 25 of a tractor.

The lower spreader arm 16 of the right hand wing is pivotally connected by a pivot pin 26 to the front end of horizontal thrust member 27 which is similar to the thrust member 22 above described. The member 27 has an upturned rear end portion which is adapted to be similarly connected to the housing 25 on the right hand side thereof.

Horizontal cross braces 29 and 30 may be provided between the two uppermost spreader arms 6 and 14, if desired.

As best illustrated in Fig. 6, the mounting bracket 4 on the rear end of the beam 1 is bolted to some convenient cross-member 28 of the tractor.

The two brackets 13 and 21 are adapted to be rigidly bolted to the front cross-member 31 of the tractor (Fig. 4).

When the device is thus installed upon a tractor, even a comparatively light weight tractor may be driven forwardly through heavy and thick underbrush without stalling for lack of power. The slanting portion 3 of the beam 1 acts as a single leading edge for the two rearwardly flared side wings of the device. The rearwardly diverging side wings and the upwardly and forwardly inclined forward end portion 3 form what I term as a prow structure. This prow structure will effectively exert a downward and outward pressure on the underbrush at a point sufficiently above the ground level and upon the trunks of the plants to more easily force the top of the underbrush towards the ground, thereby permitting the movement of the tractor therethrough with less power than would otherwise be necessary. The prow may extend to approximately the top of the tractor and possibly higher if necessary, in order that better and greater leverage may be attained in causing the downward pressing action on the underbrush. The result is that the underbrush is bent laterally aside so that the tractor wheels may pass thereover without too much resistance from the underbrush.

In order to prevent the underbrush from snapping back toward an upright position between the front and rear wheels of the tractor, the two longest thrust members 22 and 27 are provided with outwardly projecting loop frames or guards 34 and 35 respectively (Fig. 1).

The two side wings could well be sheathed with metal, if desired, or the wings could if desired be completely formed out of heavy sheet metal with proper thrust members and braces for mounting it rigidly at the front end of a tractor.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An underbrush spreader attachment for tractors comprising a longitudinally extending beam for disposition beneath the tractor, said beam being secured at its rear end to the rear portion of the tractor, the forward end portion of the beam projecting beyond the front of the tractor and being inclined forwardly and disposed upwardly, spreader wings diverging rearwardly from the opposite sides of the forwardly inclined and upwardly disposed forward end portion of the beam, the rear end portions of the spreader wings terminating at the respective sides of the front of the tractor, and supporting means for the spreader wings.

2. An underbrush spreader attachment for tractors comprising a longitudinally extending beam for disposition beneath the tractor, said beam being secured at its rear end to the rear portion of the tractor, the forward end portion of the beam projecting beyond the front of the tractor and being disposed upwardly and inclined forwardly, spreader wings diverging rearwardly from the opposite sides of the forwardly inclined and upwardly disposed forward end portion of the beam, the rear end portions of the wings terminating at the respective sides of the front of the tractor, supporting means for the spreader wings, longitudinal thrust members connected at their forward ends to the lower portions of the respective spreader wings and extending along the respective sides of the tractor, said thrust members being connected at their rear ends to the rear axle housing of the tractor, and additional underbrush deflecting members carried by the longitudinal thrust members for disposition between the front and rear wheels of the tractor.

3. An underbrush spreader attachment for tractors comprising a longitudinal central beam for disposition beneath the tractor and secured at its rear end to the rear portion of the tractor, the forward end portion of the beam projecting beyond the front of the tractor and being inclined upwardly and forwardly, spreader arms diverging rearwardly from the opposite sides of the upwardly disposed forward end portion of the beam, the rear ends of the spreader arms terminating at the respective sides of the front portion of the tractor, and supporting members for the spreader arms secured at their forward ends to said spreader arms and at their rear ends to the tractor.

4. An underbrush spreader attachment for tractors comprising a longitudinal central beam for disposition beneath the tractor and secured at its rear end to the rear portion of the tractor, the forward end portion of the beam projecting beyond the front of the tractor and being inclined upwardly and forwardly, spreader arms diverging rearwardly from the opposite sides of the upwardly disposed forward end portion of the beam, the rear ends of the spreader arms terminating at the respective sides of the front portion of the tractor, supporting braces for the spreader arms secured at their forward ends to said spreader arms and at their rear ends to the tractor, and additional underbrush deflecting members carried by certain of said braces for disposition horizontally between the front and rear wheels of the tractor.

5. An underbrush spreader attachment for tractors comprising a forwardly and upwardly inclined central underbrush engaging member arranged in front of the tractor, vertically spaced spreader arms extending horizontally and rearwardly in diverging relation from the opposite sides of said central member, the rear ends of the spreader arms terminating adjacent the respective sides of the front portion of the tractor, said central member and the spreader arms exerting a downward and outward pressure on the underbrush at an effective distance above the ground to force the top of the underbrush towards the ground, longitudinal thrust members connected at their forward ends to the lowermost spreader arms and extending along the respective sides of the tractor, the rear ends of said thrust members being secured to the rear portion of the tractor, and laterally extending underbrush deflecting members carried by the longitudinal thrust members for disposition between the front and rear wheels of the tractor.

6. An underbrush spreader attachment for tractors comprising a substantially V-shaped prow for disposition in front of a tractor, and extending from a point adjacent the ground to a point adjacent the top of the tractor, the apex portion of said prow being a single upwardly and forwardly inclined member forming the leading edge thereof, means for securing the prow to the tractor, and additional underbrush deflecting members carried by the securing means for disposition between the front and rear wheels of the tractor.

7. In an underbrush spreader attachment for tractors, a prow for disposition in front of a tractor, said prow comprising a forwardly and upwardly inclined central underbrush engaging member arranged in front of the tractor, a pair of diverging side wings attached to said member and disposed in planes that are vertically and horizontally inclined with respect to the longitudinal vertical plane of the tractor, means for securing the prow to the tractor, and additional underbrush deflecting members carried by the securing means for disposition between the front and rear wheels of the tractor.

JOHN H. Q. BURKE.

REFERENCES CITED

The following references are of record in the file of this patent:

UNITED STATES PATENTS

| Number | Name | Date |
|---|---|---|
| 355,471 | Pingree | Jan. 4, 1887 |
| 643,370 | Belcher | Feb. 13, 1900 |
| 975,265 | McCreery | Nov. 8, 1910 |
| 1,665,536 | Dierker | Apr. 10, 1928 |
| 1,692,342 | Miller | Nov. 20, 1928 |
| 1,788,879 | Lile et al. | Jan. 13, 1931 |
| 2,314,214 | Hilblom | Mar. 16, 1943 |
| 2,355,204 | Couse | Aug. 8, 1944 |
| 2,508,284 | Oliver | May 16, 1950 |

FOREIGN PATENTS

| Number | Country | Date |
|---|---|---|
| 20,705 | Great Britain | of 1890 |